No. 688,111. Patented Dec. 3, 1901.
C. PIEZ & R. H. BEAUMONT.
STORAGE APPARATUS.
(Application filed Dec. 31, 1900.)

(No Model.) 2 Sheets—Sheet 1.

Witnesses:
Wm. A. Barr
Louis A. F. Whitehead

Inventors
Charles Piez and
Robert H. Beaumont
by their Attorneys
Howson & Howson No. 688,111. Patented Dec. 3, 1901.
C. PIEZ & R. H. BEAUMONT.
STORAGE APPARATUS.
(Application filed Dec. 31, 1900.)

(No Model.) 2 Sheets—Sheet 2.

Witnesses:
Will. A. Barr.
Louis M. F. Whitehead

Inventors:
Charles Piez and
Robert H. Beaumont
by their Attorneys
Howson and Howson

UNITED STATES PATENT OFFICE.

CHARLES PIEZ AND ROBERT H. BEAUMONT, OF PHILADELPHIA, PENNSYLVANIA, ASSIGNORS, BY MESNE ASSIGNMENTS, TO THE DODGE COAL STORAGE COMPANY, OF NAUGATUCK, CONNECTICUT, A CORPORATION OF CONNECTICUT.

STORAGE APPARATUS.

SPECIFICATION forming part of Letters Patent No. 688,111, dated December 3, 1901.

Original application filed October 18, 1899, Serial No. 733,993. Divided and this application filed December 31, 1900. Serial No. 41,639. (No model.)

*To all whom it may concern:*

Be it known that we, CHARLES PIEZ and ROBERT H. BEAUMONT, citizens of the United States, and residents of Philadelphia, Pennsylvania, have invented certain Improvements in Storage Apparatus, of which the following is a specification.

Our invention relates to certain improvements in mechanism for piling coal or analogous material and for removing material from a pile.

The object of our invention is to make a comparatively cheap structure of this type in which the material can be piled in two semicircular piles and in which the conveying and elevating mechanism is carried entirely by a horizontally-swinging support.

This application is a division of an application filed by us on October 18, 1899, Serial No. 733,993.

Figure 1:
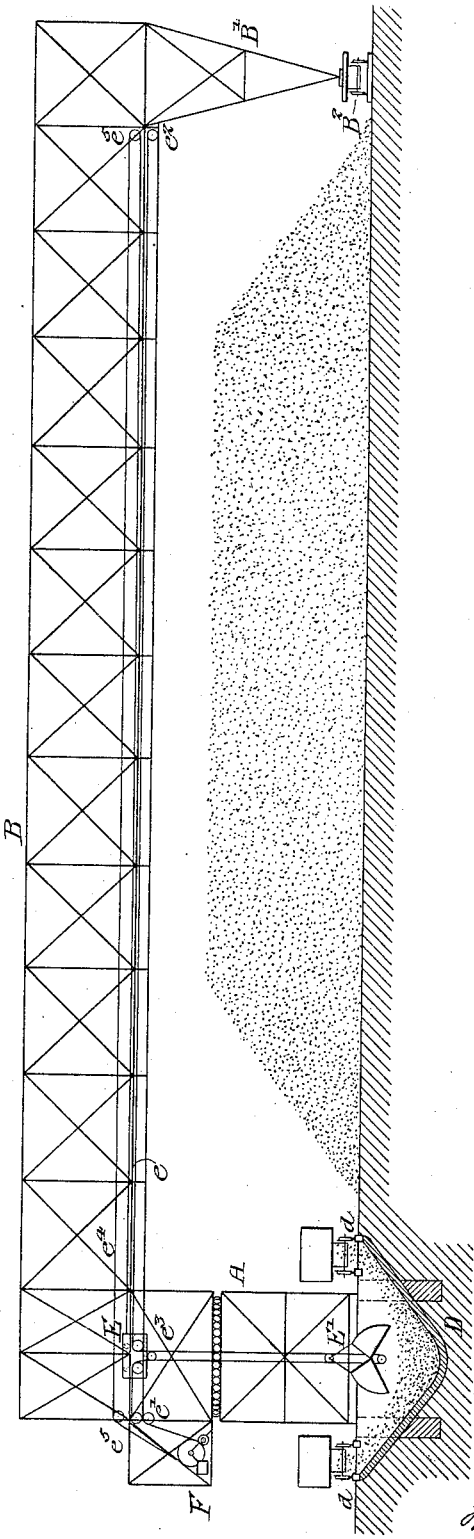
Figure 2:
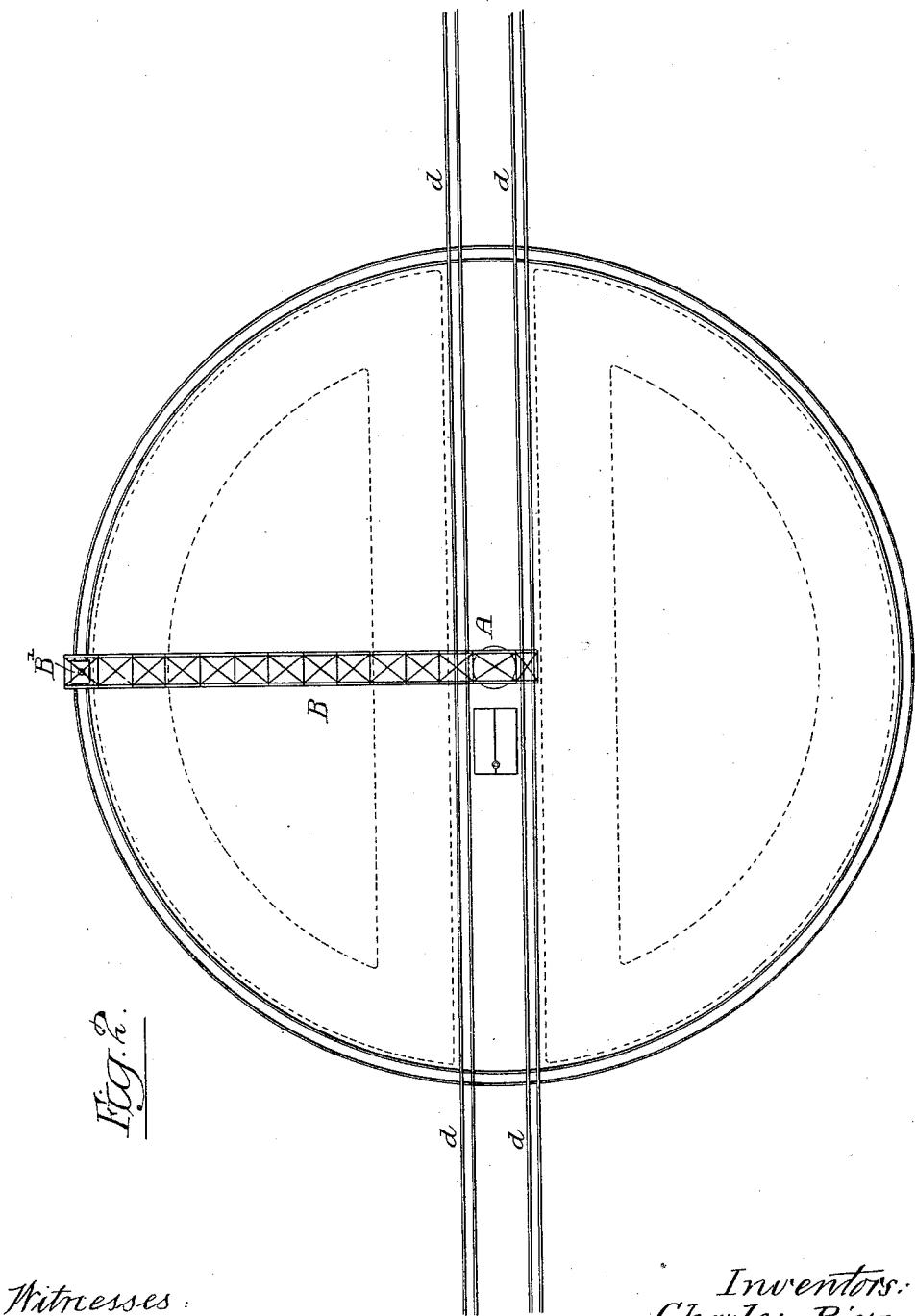

In the accompanying drawings, Figure 1 is a side view sufficiently in detail of our improved mechanism to illustrate our invention, and Fig. 2 is a plan view.

A is a tower comprising a lower fixed portion and an upper swinging or pivoted portion mounted on an open or annular pivot, so as to turn upon the fixed portion. To this pivoted portion of the tower is secured a carrier support or arm in the form of a truss structure B, the whole forming a horizontally-swinging support for hoisting and conveying mechanism hereinafter described. This truss may be of any length, according to the size of the pile desired. The truss structure is supported at its outer end by a leg B′, mounted on a carriage B², which in the present instance travels on a circular or semicircular track.

We have shown a hopper or bin D directly under the tower, and on each side of the tower are tracks $d\,d$ for the loaded cars. The hopper extends under the tracks, so that material discharged from the cars flows into the hopper.

Carried by the pivoted support B is the elevating and conveying mechanism, consisting in the present instance of a series of ropes or chains $e$, passing around pulleys $e'\ e^2$ and around pulleys $e^3$ on a truck E and down and around the wheels of a clam-shell bucket E′, which is opened and closed in a manner common to this class of buckets. The hoisting and conveying ropes are operated by a usual form of hoisting-engine F, preferably mounted on the pivoted support, and the position of the bucket is regulated by the operator stationed near the engine, so that if it is wished to pile material under the support the operator so controls the mechanism that the clam-shell bucket E′ will be lowered into the hopper D and will take a load of material from the hopper, elevate it through the open pivot of the rotatable tower to a point directly under the support, and then carry it forward along the support to the point at which it is desired to discharge the material. This material can either be discharged from the elevated bucket, or if it is fragile material the bucket can be lowered and discharged at any height from the ground or piling-floor and can then be returned to the pivot-point and again loaded. The carriage E can be moved along the support B by any suitable means. We have shown ropes $e^4$, passing around pulleys $e^3$ to the drum of the engine. The support can be turned on its pivot in any suitable manner either by hand or power.

An engine may be mounted on the truck B² and geared to the axle of the truck, if desired, as shown in the application of which this is a division.

When it is wished to discharge the material from the pile, a bucket is lowered onto the pile so as to receive material from the pile and carry it to the discharge-point and load it either directly onto cars at the pivot-point or into a hopper or bin constructed for the purpose of receiving material from the pile. It will thus be seen that we only use one mechanism for both elevating and conveying and carry the said mechanism by the horizontally-swinging support, making a very simple and practical apparatus.

It will be seen on referring to Fig. 2 that by our construction of piling apparatus we are enabled to pile material on each side of the tracks $d\,d$, the fixed structure being preferably mounted between the tracks and with a hopper or pit common to both tracks. The pivoted truss structure or support is arranged to rotate on this fixed structure and travel on a circular track, so that two segmental piles are formed, one on each side of the tracks $d\,d$. By this method of piling it will be seen that two grades of coal may be piled with one apparatus, and if the tracks are so situated that the structure can only pile on one side of the track this can be readily accomplished.

The essential feature of the above-described apparatus is the open fixed structure or tower, a horizontally-swinging support pivoted to the tower and arranged to swing over a certain area, the pivot having an open center through which the material can be elevated from a hopper or pit to the swinging support and carried along the said support and discharged at any point desired. The structure is also so constructed that the clam-shell bucket can remove material from the pile, and the bucket can be carried along the swinging support and its contents deposited at any point desired, either directly into cars or boats or into the hopper.

While we have used the words "horizontally-swinging support" in this description, it will be obvious that a support swinging in an inclined plane may be used without departing from the spirit of our invention, and therefore by the words "horizontally-swinging support" as used in the claims it is intended and desired to include any pivoted support which moves laterally upon its pivot, whether in a horizontal or an inclined plane.

We claim as our invention—

1. In combination, a track, a pit located in position to receive coal dumped from a car on said track, a tower above said pit and having a clear hoisting-opening above the pit, a horizontally-swinging support extending laterally from said tower, a trackway upon said support, a bucket-carriage upon said trackway, a bucket, and means whereby said bucket may be hoisted and lowered both within said tower and from said trackway, and means whereby said carriage may be propelled, substantially as described.

2. The combination of a tower having an axial hoisting-opening extending through its base, a horizontally-swinging support connected with said tower, a trackway extending from substantially the pivotal axis of said tower out onto said support, a carriage on said trackway, a coal-bucket, and means whereby said coal-bucket may be hoisted and lowered from said carriage, substantially in the pivotal axis of said tower and also at other points on said trackway, substantially as described.

3. In a device for handling and storing coal and similar materials, the combination with a tower mounted to turn upon a pivot and having a central hoisting and lowering opening, a receiving-bin beneath said opening and a carrier-support extending from said tower and movable with said tower as a pivot, of a hoisting and conveying apparatus mounted upon said tower and carrier-support, and adapted to take material from and to deposit it within either the bin or the space covered by said support at will.

4. In a device for handling and storing coal and similar materials, the combination with a pivoted tower having an axial hoisting-opening, a radial track connected with said tower and movable upon a common pivot therewith, of a receiving-bin beneath said tower, and a hoisting and conveying apparatus comprising a carrier movable on said track, and a coal receiver and conveyer carried thereby and adapted to be lowered within the tower into said bin.

5. In a device for handling and storing coal and similar materials, the combination with a tower mounted to turn upon a pivot and having a clear central hoisting-opening therein, extending through its base, and a radial support for a carrier adapted to swing with the tower, of a hoisting apparatus mounted upon said tower and radial support, and adapted to take or deliver material at will either through the axis of the tower or from beneath said support.

6. In a device for handling and storing coal and similar materials, the combination with a tower mounted to turn upon a pivot and having a clear central hoisting-opening therein, a radial arm adapted to swing with the tower and a traveling support for the outer end of said arm, of a hoisting and conveying apparatus mounted upon said tower and radial arm and adapted to take or deliver material at will, either through the axis of the tower or from beneath said arm.

7. In a device for handling and storing coal and similar materials, the combination with a tower mounted to turn upon a pivot and having a clear central hoisting opening therein, a radial arm adapted to swing with the tower, hoisting and conveying apparatus mounted upon said tower and arm, and an engine for operating said mechanism also mounted upon and swinging with the tower, substantially as described.

In testimony whereof we have signed our names to this specification in the presence of two subscribing witnesses.

CHARLES PIEZ.
ROBERT H. BEAUMONT.

Witnesses:
WILL A. BARR,
JOS. H. KLEIN.